Oct. 7, 1924.

R. R. HART

PISTON

Filed Feb. 15, 1922    2 Sheets-Sheet 1

1,510,778

Inventor

R. R. Hart.

By Lacey & Lacey, Attorneys

Oct. 7, 1924.
R. R. HART
PISTON
Filed Feb. 15, 1922

Inventor
R. R. Hart.

By
Lacey & Lacey, Attorneys

Patented Oct. 7, 1924.

1,510,778

UNITED STATES PATENT OFFICE.

ROY R. HART, OF TULARE, CALIFORNIA.

PISTON.

Application filed February 15, 1922. Serial No. 536,744.

*To all whom it may concern:*

Be it known that I, ROY R. HART, a citizen of the United States, residing at Tulare, in the county of Tulare and State of California, have invented certain new and useful Improvements in Pistons, of which the following is a specification.

This invention relates to an improved piston particularly designed for use in connection with internal combustion engines and seeks, as one of its principal objects, to provide a piston which will be practically compression tight.

A further object of the invention is to provide a piston constructed to insure effective lubrication and wherein the rings and ring groove will be oiled at all times.

A further object of the invention is to provide a piston wherein any compression leakage past the piston rings will be diverted through the wall of the piston to the engine crank case.

And the invention has as a still further object to provide a piston embodying an improved piston ring assembly.

Other and incidental objects will appear hereinafter.

Figure 1:
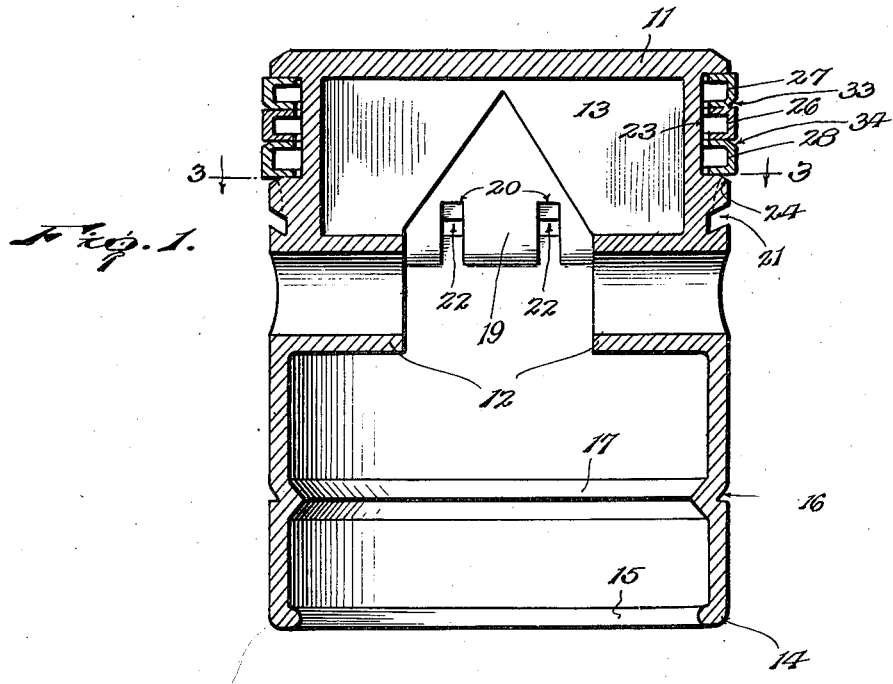
Figure 1 is a vertical sectional view through my improved piston.

In carrying the invention into effect, I employ a shell 10 closed at its upper end by an end wall 11 and integrally formed on the shell are alined wrist pin bearings 12. Extending between the upper sides of these bearings and the end wall is a bracing web 13 for rigidly supporting the bearings, the web being, as particularly shown in Figure 1, preferably notched upwardly between the inner ends of the bearings for minimizing weight. At its lower end, the shell is formed with a rounded lower edge 14 and is preferably reinforced by an internal rib 15 and formed in the shell near its lower end is an annular substantially V-shaped oil groove 16 having a straight lower wall lying at substantially right angles to the axis of the shell while the upper wall of the groove inclines outwardly and upwardly to gradually merge into the peripheral surface of the shell. Reinforcing the shell at the groove 16 is an internal V-shaped rib 17 and formed in the shell at the plane of the wrist pin bearings 12 is an annular oil channel 18. This channel extends throughout the major portion of the height of said bearings and is relatively shallow while, preferably, the groove 16 is somewhat deeper. The lower wall of the channel 18 lies at substantially right angles to the axis of the shell while the upper wall of said channel inclines upwardly and outwardly and gradually merges into the peripheral surface of the shell.

Figure 2:
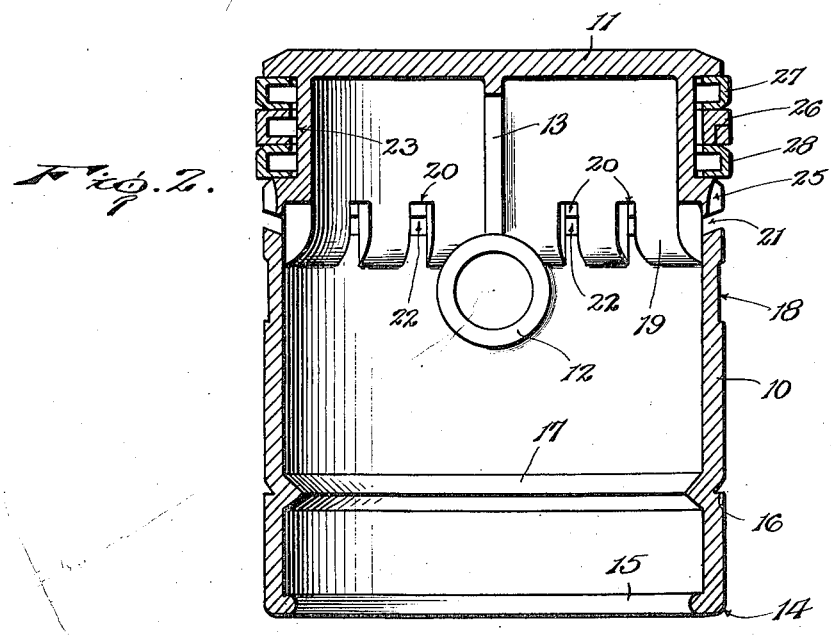
Figure 2 is a vertical sectional view taken at right angles to Figure 1.
Figure 3:
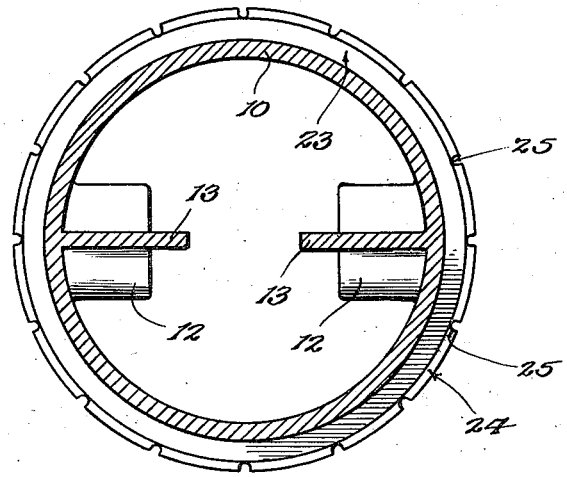
Figure 3 is a transverse sectional view on the line 3—3 of Figure 1, looking in the direction of the arrows.

Attention is now directed to the fact that the shell 10 is provided at the upper sides of the wrist pin bearings 12 with an offset 19 and formed in said offset at the inner side of the shell is an annular series of vertically disposed drainage slots 20. Formed in the outer side of the shell at said offset is an annular downwardly and inwardly inclined drainage groove 21 intersecting said slots to provide a plurality of drainage openings 22 leading from the groove through the wall of the shell. Above the groove 21 the shell is provided externally with a relatively wide ring groove 23, the bottom wall of which is provided at its outer margin with a beveled face 24 and formed through said bottom wall is, as shown in detail in Figure 3, an annular series of spaced drainage slots 25 leading into the groove 21. At their upper ends, these slots are of a depth corresponding to the width of the face 24 and, as shown in Figure 2, gradually increase in depth toward their lower ends.

Figure 5:
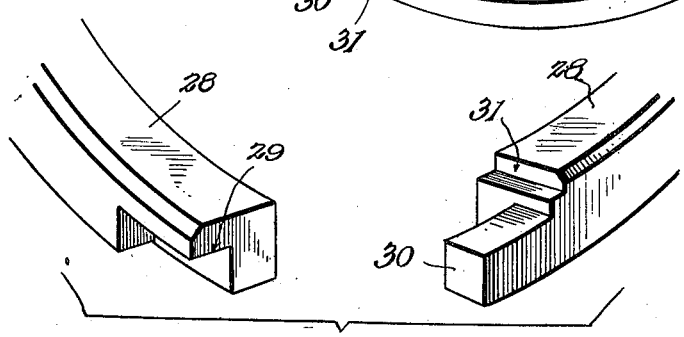
Figure 5 is a perspective view particularly illustrating the joint between the ends of one of the rings.

Mounted in the ring groove 23 is a series of companion split, resilient rings which, for convenience, have been indicated at 26, 27 and 28, respectively. These rings rest one upon the other and are relatively wide so as to provide ample bearing surface between the rings as well as between the upper and lower rings and the top and bottom walls of the ring groove. The rings are channeled at their inner sides so as to insure lightness and resiliency and formed in corresponding ends of said rings are, as shown in detail in Figure 5, notches 29.

Figure 4:
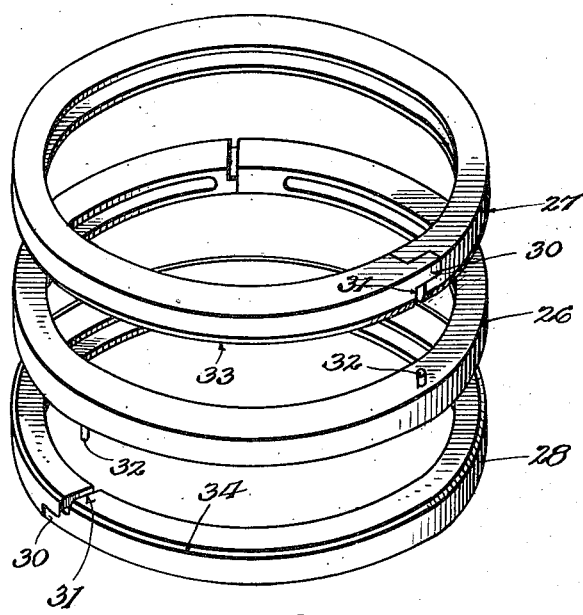
Figure 4 is a perspective view showing the piston ring assembly, the rings, however, being separated.

These notches open through the outer side faces as well as the bottom faces of the rings and formed on the rings at their opposite ends are tongues 30 slidably fitting in said notches. At the bases of the tongues, the rings are cut away at their upper sides to provide transverse notches 31 and mounted upon the center ring 26 at its upper and lower sides are oppositely directed pins 32 freely engaging in said notches for locking the rings against creeping with respect to each other. The joints of the rings are, as shown in Figure 4, staggered with respect to each other and, as will be seen, by locking the rings against creeping, said joints cannot become alined. Furthermore, the pins 32 will connect the rings to function as a single unit and will tend to equalize radial pressure of the rings for insuring a sealed joint between the rings and the wall of the cylinder even though the cylinder should be worn out of round, as it is generally termed. At its lower side, the upper ring 27 is provided at its outer margin with a beveled face 33 while at the outer margin of the upper face of the lower ring 28 is a similar beveled face 34. The upper and lower faces of the center ring are straight so that, as shown in Figures 1 and 2, the oil grooves are provided between the center ring and the upper and lower rings while, owing to the presence of the beveled face 24 at the bottom side of the lower ring, a similar oil groove is provided between the latter ring and the bottom wall of the ring groove.

As will now be appreciated in view of the foregoing, when the piston moves upwardly, the center ring 26 will scrape oil into the groove between this ring and the top ring 27 while, when the piston moves downwardly, the center ring will scrape oil into the groove between said ring and the bottom ring 28. The ring assembly will thus be maintained constantly lubricated. Similarly, the lower ring 28 will, when the piston moves downwardly, scrape oil into the groove between said ring and the bottom wall of the ring groove 23 which oil will, when the piston moves upwardly, be expelled through the slots 25 into the drainage groove 21, whence the oil will then flow through the openings 22 and slots 20 to the interior of the piston and thence to the engine crank case. By providing the piston with the rounded lower edge 14, the piston will, when moving downwardly, leave a film of oil upon the cylinder wall. However, upon upward movement of the piston, the straight lower walls of the groove 16 and channel 18 will scrape a portion of the oil from the cylinder wall into said groove and channel. Accordingly, when the piston is then again moved downwardly, lubricant will be fed from the groove 16 and channel 18 to the cylinder wall over the upper inclined top walls of the groove and channel and since these walls merge gradually into the peripheral surface of the piston, the lubricant will be distributed in a thin film over the cylinder wall. Since each time the piston moves upwardly a fresh quantity of lubricant is splashed to the cylinder wall, the groove 16 and channel 18 will, in turn, be constantly supplied with lubricant so that lubricant may, accordingly, be fed from said groove and channel to the wall of the cylinder at each downward stroke of the piston for maintaining the piston effectively lubricated. Should any compression leak past the rings at the upper end of the piston, such compression will, upon reaching the groove 21, follow the course of least resistance and enter said channel to flow through the openings 22 and slots 20 into the piston and thence to the crank case and, of course, a similar result would obtain should any vacuum pressure leak past the rings. Accordingly, the film of oil about the lower end portion of the piston will be maintained undisturbed. I thus provide a piston which will be efficiently lubricated at all times.

Having thus described the invention, what is claimed as new is:

1. A piston including a shell having a ring groove and externally channeled below the ring groove to provide an external oil groove separated from the ring groove by an intervening web extending flush with the peripheral surface of the shell and having a surface slot therein opening through the said surface of the shell and connecting the ring groove with the oil groove.

2. A piston including a shell having an offset in the wall thereof and externally channeled at said offset to provide an external upwardly and outwardly inclined oil groove forming an annular oil pocket, the shell being formed above the oil groove with a ring groove separated from the oil groove by an intervening web extending flush with the peripheral surface of the shell, said web having a surface slot therein connecting the ring groove with the oil groove and said offset being formed at the inner side of the shell with a slot opening through the lower edge of said offset and communicating with the oil groove forming a drainage passage from the oil groove into the shell.

3. A piston including a shell having an offset in the wall thereof and provided at said offset with an external oil groove of a depth equal to the thickness of the shell and tilted upwardly to form an oil pocket, the offset being formed at the inner side of the shell with a vertical slot of a depth equal to the thickness of said offset and opening into said oil groove forming a drainage passage into the interior of the shell.

4. A piston including a shell having an offset in the wall thereof and channeled at said offset to provide an external oil groove tilted upwardly to form an oil pocket, the offset being formed at the inner side of the shell with slots to intersect said groove providing outlets from the groove to the interior of the shell and defining intermediate tongues extending across said groove connecting the portions of the shell at opposite sides of said groove and bracing the shell at the groove.

In testimony whereof I affix my signature.

ROY R. HART. [L. S.]